US009195038B2

(12) United States Patent  (10) Patent No.: US 9,195,038 B2
Aikio  (45) Date of Patent: Nov. 24, 2015

(54) OMNIDIRECTIONAL LENS, OPTICAL DEVICES UTILIZING THE LENS AND METHOD FOR OPTICAL MEASUREMENT

(75) Inventor: Mika Aikio, Vtt (FI)

(73) Assignee: TEKNOLOGIAN TUTKIMUSKESKUS VTT, Vtt (FI)

( * ) Notice: Subject to any disclaimer, the term of this patent is extended or adjusted under 35 U.S.C. 154(b) by 67 days.

(21) Appl. No.: 13/574,475

(22) PCT Filed: Jan. 21, 2011

(86) PCT No.: PCT/FI2011/050045
§ 371 (c)(1),
(2), (4) Date: Sep. 24, 2012

(87) PCT Pub. No.: WO2011/089320
PCT Pub. Date: Jul. 28, 2011

(65) Prior Publication Data
US 2013/0010279 A1  Jan. 10, 2013

(30) Foreign Application Priority Data
Jan. 22, 2010  (FI) .................................... 20105058

(51) Int. Cl.
*G01C 3/08* (2006.01)
*G02B 17/00* (2006.01)
*G02B 19/00* (2006.01)
*G01S 7/481* (2006.01)
(Continued)

(52) U.S. Cl.
CPC ............. *G02B 19/0085* (2013.01); *G01S 7/481* (2013.01); *G02B 19/008* (2013.01); *G02B 19/0028* (2013.01); *G02B 19/0071* (2013.01); *G02B 13/06* (2013.01); *G02B 26/10* (2013.01)

(58) Field of Classification Search
CPC ........ G02B 13/06; G02B 17/00; G02B 17/08; G02B 17/086; G02B 19/0071; G02B 19/0085; G02B 19/0028; G02B 19/008; G01C 3/08; G01C 26/10
USPC ......... 356/4.01; 359/725, 726, 727, 729, 732, 359/731
See application file for complete search history.

(56) References Cited

U.S. PATENT DOCUMENTS 2,638,033 A * 5/1953 Buchele et al. ............... 359/725
3,516,743 A * 6/1970 Tommaso et al. ............ 356/4.01
5,473,474 A   12/1995 Powell
(Continued)

FOREIGN PATENT DOCUMENTS

EP    1 562 055 A2    8/2005
EP    2 124 069 A1   11/2009
(Continued)

*Primary Examiner* — Isam Alsomiri
*Assistant Examiner* — Vicente Rodriguez
(74) *Attorney, Agent, or Firm* — Birch, Stewart, Kolasch & Birch, LLP

(57) ABSTRACT

The invention relates to an omnidirectional lens, an optical measuring device, and a method for optical measurement. The lens comprises a central portion, collecting optically in a first direction, and an edge portion, which surrounds the central portion, and which is arranged to guide the light arriving at the edge portion omnidirectionally relative to the said first direction essentially transversely relative to the said first direction. According to the invention, the edge portion is arranged to guide the light through the central portion. With the aid of the invention, it is possible to create, for example, a simpler laser radar.

22 Claims, 3 Drawing Sheets

(51) Int. Cl.
*G02B 13/06* (2006.01)
*G02B 26/10* (2006.01)

(56) References Cited

U.S. PATENT DOCUMENTS

| | | | |
|---|---|---|---|
| 6,118,474 A * | 9/2000 | Nayar | 348/36 |
| 7,245,443 B2 * | 7/2007 | Togino | 359/725 |
| 7,362,516 B2 * | 4/2008 | Gal et al. | 359/725 |
| 7,852,463 B2 * | 12/2010 | Hartman et al. | 356/5.01 |
| 2003/0099045 A1 | 5/2003 | Doi | |
| 2005/0111084 A1 * | 5/2005 | Mandella | 359/364 |
| 2008/0151380 A1 | 6/2008 | Togino | |

FOREIGN PATENT DOCUMENTS

| | | |
|---|---|---|
| JP | 2000-4383 A | 1/2000 |
| JP | 2006-243689 A | 9/2006 |
| JP | 2006-285002 A | 10/2006 |

* cited by examiner

OMNIDIRECTIONAL LENS, OPTICAL DEVICES UTILIZING THE LENS AND METHOD FOR OPTICAL MEASUREMENT

The invention relates to optical measurement, such as laser-assisted optical measurement. In particular, the invention relates to laser radars and omnidirectional lenses suitable for use in them, and to lens arrangements.

More specifically, the invention relates to a lens according to the preamble of Claim 1, a lens-mirror system according to Claim 10, an optical measuring device according to the preamble of Claim 11, and a method according to the preamble of Claim 15.

Separate-channel laser radars are based on the idea of sending a laser beam in a certain direction to an object and collecting the light reflected from this direction over different paths in a detector. The direction of the transmitting and receiving beams is generally selected with the aid of mirrors, which can be rotated to detect objects over a wide area. A problem with large detection-angle (>270 degrees) separate-channel laser radars is the synchronization between the transmission and the reception beams. If the synchronization is wrong, measurement will either fail completely or not be reliable.

Figure 1:
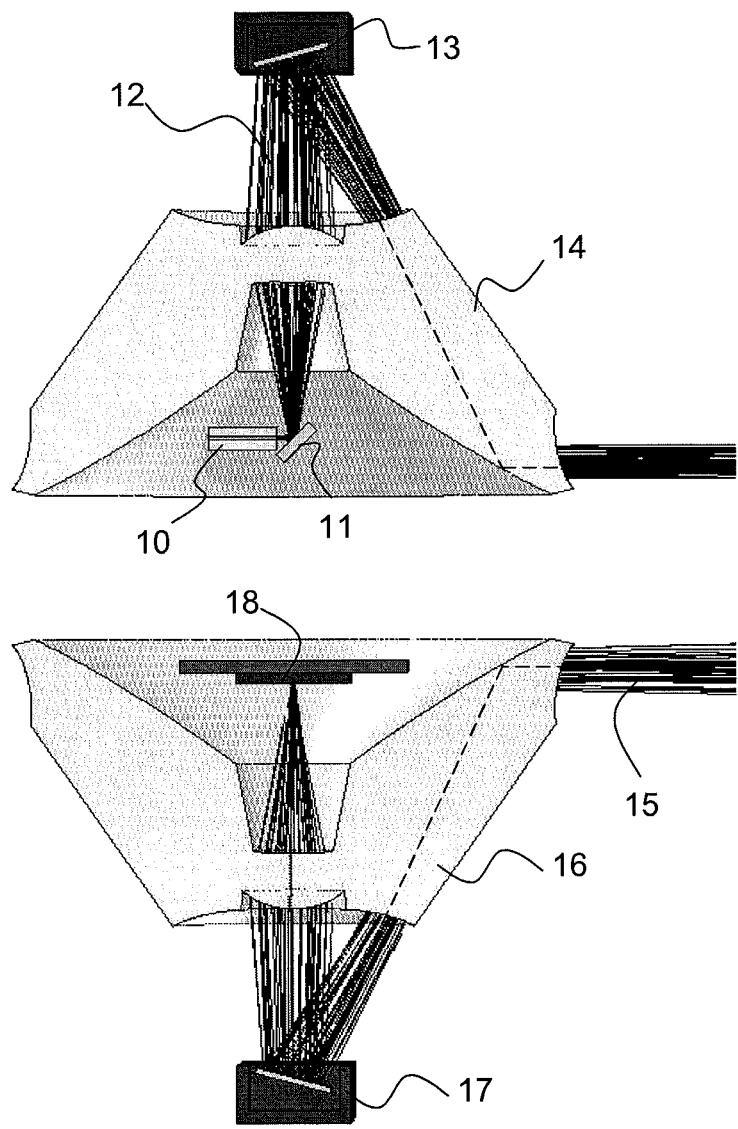

FIG. 1 shows a typical two-channel laser-radar arrangement. It comprises a light source 10 and a mirror 11, through which a beam of rays 12 is guided through a first omnidirectional lens 14 to a rotatable mirror 13 and then to a lens 14, in which its direction of travel is deviated to be essentially at right angles to the direction of the original beam 12. The deviated beam is guided to the object and the reflected beam 15 is collected, with the aid of a second omnidirectional lens 16, to a second rotatable mirror 17 and then to a photo-detector 18. As the figure shows, two mirrors are required, which must be synchronized for the measurement to succeed.

Known omnidirectional lenses are disclosed in, for instance, WO publications 2003/46830, 2004/42428, US 2005/0111084, U.S. Pat. No. 2,638,033, and JP 2000-004383. However, they are not suitable as such for laser-radar arrangements, due to the alignment of the beam. This is because the lenses in question are designed to image the landscape at one time from around the entire omnidirectional lens, which is not suitable for measuring direction and distance, for example.

The present invention is intended to create a lens, a measuring instrument, and a method, with the aid of which the problem of synchronizing the mirrors can be avoided.

The invention is based on the idea of providing an omnidirectional lens, which permits the use of the same beam-guidance component (e.g., a rotatable or tiltable mirror) for the transmitted light and the reflected light. This is achieved with the aid of a so-called 'inverting' omnidirectional lens. Such a lens comprises a central portion, collecting optically in a first direction, and an edge portion, which is around the central portion, and which is arranged to guide the light arriving at the edge portion omnidirectionally relative to the said first direction and essentially transversely to the said first direction, so that the edge portion is arranged to guide the light across the optical axis of the central portion.

Because the light is guided omnidirectionally from the edge portion to the central portion, or at least across its optical axis, its direction turns in such a way that the light beam arriving at the edge portion and that leaving the edge portion form an acute angle, whereas in a typical omnidirectional lens the angle between them is obtuse. On the other hand, if the matter is examined relative to the observation plane, the departing direction of the beam is deviated by 180° on the detection plane of the omnidirectional lens, compared to typical omnidirectional lenses.

According to a preferred embodiment of the invention, the edge portion is arranged to guide the light passing through the central portion in the first direction and reflected back to the edge portion of the lens in the second direction, which deviates from the said first direction. Further, the lens is preferably designed in such a way that the light passing through the central portion in the first direction can be guided, with the aid of a mirror at an angle to the first direction, back to the edge portion of the lens, which collects the light, and in which its direction is deviated by more than 90° and is guided omnidirectionally relative to the first direction essentially transversely to the said first direction across the optical axis of the central portion and from there out of the lens. In other words, the lens is designed to be such that the light travels twice through the same lens, while travelling in between outside the lens.

With the aid of the invention, a simpler laser radar, for example, or some other two-channel optical measuring device can be created.

Thus, the optical measuring device according to the invention comprises a light source, a photo-detector, a first omnidirectional lens, and a second omnidirectional lens. Light can be guided from the light source to the first omnidirectional lens. In addition, in the device there are means for guiding light from the first omnidirectional lens to the object in the desired direction and means for collecting the light reflected from the object through the second omnidirectional lens to the photo-detector. According to the invention, one of the lenses is an inverting omnidirectional lens like that described above, the second lens being preferably a non-inverting omnidirectional lens.

Most preferably, the means for guiding light to the object in the desired direction and the means for collecting the light reflected from the object comprise one rotatable mirror, from the opposite sides of which light can be reflected to the object and to the detector, through the first and second lenses, respectively. In such a measuring device, there is therefore no need for two rotatable mirrors, instead only a single beam-guiding component can be used, for example, a two-sided mirror, in which case synchronization problems will be avoided.

In the method according to the invention, light is emitted to the object through one omnidirectional lens and light is collected from the object through a second, inverting omnidirectional lens, through which the light is guided transversely.

More specifically, the invention is characterized by what is stated in the characterizing portions of the independent Claims.

We use the term omnidirectional lens to refer to a lens, which has a visual field of 360° around the lens, in a specific observation angle. Further, lenses like those being described are typified by being arranged to orientate or collect light, which travels through the optical axis of the central portion. Because the path of the light in inverted, in the present document the meanings of the words 'collect' and 'orientate' and similar can often be changed to their opposites, even though this is not separately mentioned.

The term 'essentially transversely' to the said first direction, i.e. relative to the direction of the optical axis of the central portion of the lens, most typically refers to an angle of 90° between the axes of the incoming and outgoing beams. However, lenses and measuring devices can also be implemented, in which this angle is, for example, 45°-136°, in which case the lens/device does not 'look' straight to the side, but at a slant upwards or downwards.

The present lens can be used especially in all two-channel omnidirectional measuring devices, in which the mutual synchronization of the channels' measuring beams is important. One such application is laser radar.

The essential difference and advantage of the invention compared to traditional omnidirectional lenses in precisely a laser-radar application is that it permits a beam-direction-selection functionality, implemented using a rotatable mirror, using which the desired narrow band of a 360° visual field can be delimited for measurement. If the same result is sought, using, for example, lenses according to the aforementioned prior art, the location of the radiation source should move in the focal plane. In addition, not one of the said lenses according to the prior art can be used in laser-radar measurement, without the measuring distance suffering, unless their size is greatly increased relative to the existing system. The factor affecting the measuring distance is the diameter of the collimated beam coming from infinity on the surface of the lens, and, because the lenses presented in the aforementioned patent publications have a vertical visual field of tens of degrees, the beam diameter leaving in one direction on the surface of the lens will unavoidably remain smaller, unless the size of the lens is increased.

In the following, embodiments of the invention are examined in greater detail, with reference to the accompanying drawings.

FIG. 1 presents a side cross-section of a known laser-radar arrangement.

Figure 2:
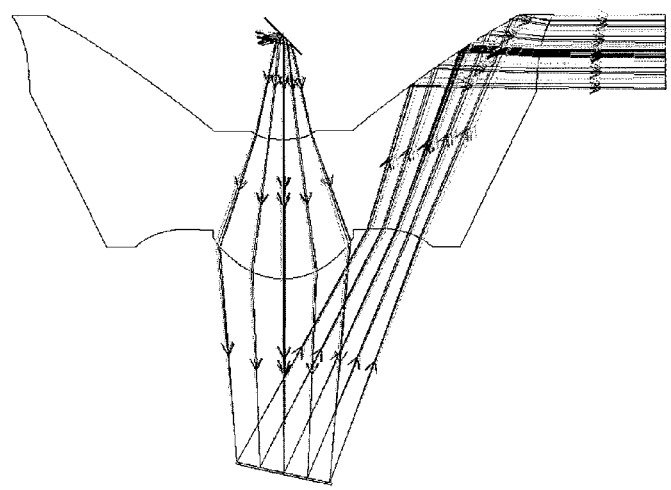

FIG. 2 presents a side cross-section of a known omnidirectional lens.

Figure 3:
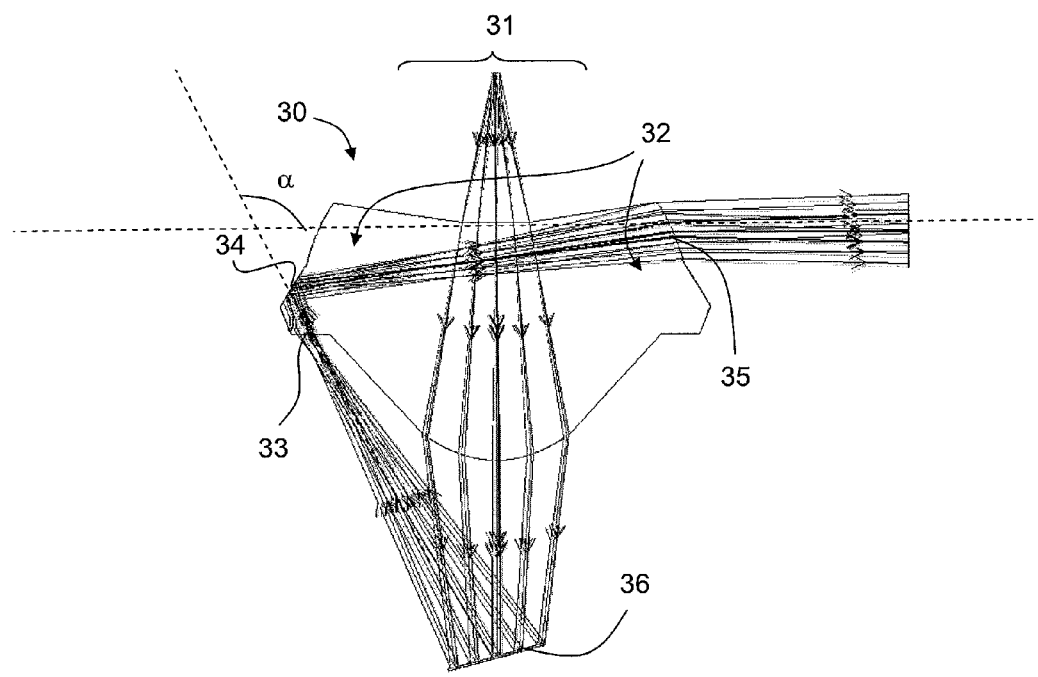

FIG. 3 presents a side cross-section of an inverting omnidirectional lens, according to one embodiment of the invention.

Figure 4:
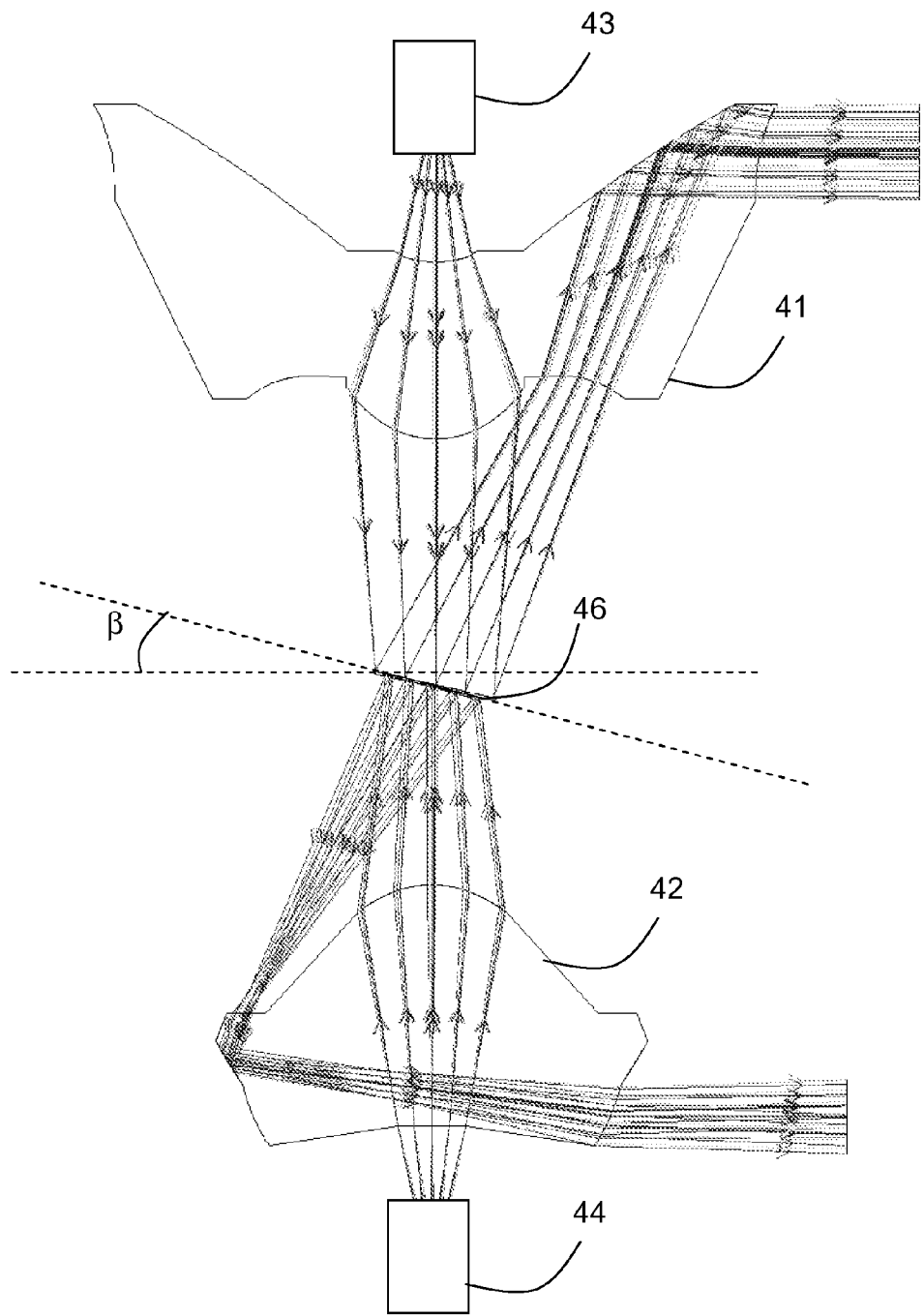

FIG. 4 presents a side cross-section of a laser-radar arrangement exploiting the present rotatable lens, according to one embodiment.

As described above, the invention relates to an omnidirectional lens, which can divert the direction of travel of the light beam in a direction counter to that of the beam arriving at the lens. The invention permits the construction of a two-channel laser radar, in which only a single beam-guiding component is used. This avoids the problem of synchronizing the components guiding the separate beams.

With reference to FIG. 3, according to one embodiment, the present omnidirectional lens 30 comprises an optically concave central portion 31 and a preferably rotationally symmetrical edge portion 32 located around this. The edge portion comprises the following zones at a distance from the optical axis of the central portion 31:
  a first boundary-surface zone 35, which is arranged to collect or orientate the light omnidirectionally relative to the optical axis of the central portion,
  a second boundary-surface zone 33, such as the shoulder according to FIG. 3, which is arranged to orientate or collect light (going to a rotatable mirror or coming from a rotatable mirror, respectively) at a slanting angle relative to the optical axis of the central portion, respectively,
  a reflective zone 34, which is arranged to reflect the light entering the lens 10 through the first or second boundary-surface zone 35, 33, essentially transversely through the central portion 31 and then to the second or first boundary-surface zone 33, 35 respectively.

Thus, the combined effect of the edge portion, i.e. the first boundary-surface zone and, on the other hand, the reflection zone and second boundary-surface zone, located correspondingly on the opposite side of the lens, as well as the mirror, creates the light-'inverting' property of the lens, which in turn permits, for example, the implementation of the described laser radar exploiting a single mirror.

Thanks to the said zones, the lens is suitable for collecting light omnidirectionally, turning its direction of travel by more than 90°, preferably 100°-170°, particularly 105°-135° (with reference to the markings of FIG. 3, $\alpha$>90°, and guiding the light in such a way that it then crosses over the optical axis of the central portion.

In practice, the central portion of the lens is preferably optically concave in the first direction, the edge portion continuing from the first portion as a circularly symmetrical shoulder, at essentially right angles to the said first direction. The location on the shoulder at which the light will strike, or from which location on the shoulder the light will be collected is defined with the aid of a beam-guiding means 36, such as a mirror.

According to one embodiment, the present lens consists of a unified piece, manufactured from a single optical material, such as glass. The reflection zone 34 can operate on the prismatic principle, so that a separate reflecting material will not be required, or alternatively the reflection zone can comprise, for example, a reflective coating.

With reference to FIG. 4, according to one embodiment measurement is performed in such a way that
  light is emitted from a light source 43,
  the light is collimated with the aid of the central portion of a first omnidirectional lens 41,
  the light is guided to a rotatable mirror 46, which is located at an angle relative to the collimated beam,
  the light is reflected from the first surface of the rotatable mirror to the edge portion of the first omnidirectional lens 41, in which the direction of travel of the light is changed to become essentially transverse relative to the collimated light beam,
  the transverse beam is guided to the object,
  the light reflected from the object is collected with the aid of the edge portion of a second omnidirectional lens, from which the light is guided to the second surface of the said rotatable mirror 46, which is the opposite surface to the first surface,
  the light is reflected from the second surface of the said rotatable mirror 46, through the central portion of the second omnidirectional lens, to a photo-detector 44.

Thus, according to a preferred embodiment, except for the beam-guiding component (the mirror 46), collection and reception components that are separate from the transmission components are used.

The rotatable mirror 46 is arranged at an angle, relative to the optical axes of the said lenses. The angle between the normal of the mirror and the optical axes of the lenses is preferably 5°-45°, particularly 5°-25° (correspondingly, in FIG. 4, $5°\leq\beta\leq45°$ applies to the angle $\beta$ between the plane of the mirror and the detection plane of the lenses). The angle of the mirror 46 and the distance from the lenses must be selected according to the properties of the lenses. If the angle is large, particularly >25°, it will be possible to manufacture measuring instruments of a smaller size than previously, as the vertical space required (in the plane of the accompanying figures) decreases.

The invention claimed is:
1. An omnidirectional lens, which comprises
  a central portion, through which light can be guided in a first direction, and an edge portion, which surrounds the central portion, and which is arranged to guide light arriving at the edge portion omnidirectionally with respect to the first direction at an oblique angle or essentially transversely relative to the first direction, wherein the edge portion is arranged to guide the light, which has passed through in the first direction and been reflected back to the edge portion, through the central portion in a second direction, which deviates from the first direction, and the edge portion comprises the following zones:
a first boundary-surface zone, which is arranged to collect or orientate the light omnidirectionally relative to said first direction,
a second boundary-surface zone, which is arranged to orientate or collect the light at an oblique angle, relative to the first direction,
a reflection zone, which is arranged to reflect the light entering the lens through the first or second boundary-surface zone, essentially transversely through the central portion and then to the second or first boundary-surface zone, respectively.

2. An omnidirectional lens, which comprises
a central portion, through which light can be guided in a first direction, and
an edge portion, which surrounds the central portion, and which is arranged to guide light arriving at the edge portion omnidirectionally with respect to the first direction at an oblique angle or essentially transversely relative to the first direction, wherein the edge portion is arranged to guide the light, which has passed through in the first direction and been reflected back to the edge portion, through the central portion in a second direction, which deviates from the first direction, and the edge portion is configured in such a way that the light passing through the central portion in the first direction can be, with the aid of a mirror set at an angle relative to the first direction, guided back to the edge portion of the lens, where the light's direction is deviated by more than 90° and is guided omnidirectionally relative to the first direction essentially transversely relative to the first direction across the optical axis of the central portion and then out of the lens.

3. The lens according to claim 1, wherein the edge portion is arranged to turn the direction of travel of the light by more than 90°.

4. The lens according to claim 1, wherein the edge portion is arranged to collect or guide the light by 360° around the said first direction and to guide or collect the light through the central portion, respectively.

5. The lens according to claim 1, wherein the central portion consists of a lens, particularly a concave lens, the optical axis of which is in the said first direction.

6. The lens according to claim 1, wherein the edge portion continues from the central portion as a circularly symmetrical shoulder essentially at right angles relative to the said first direction.

7. The lens according to claim 1, consisting of a unified piece manufactured from a single optical material.

8. The lens according to claim 1, wherein the second direction is at an angle of 45°-135° relative to the said first direction.

9. A lens-mirror arrangement, comprising a lens according to claim 1, as well as a mirror at an angle to the said first direction, the mirror being typically rotatable or tiltable, and to which the light can be guided through the central portion of the lens, and which is arranged to guide the light to the said edge portion, in order to guide it further through the central portion in said second direction, and then out of the lens.

10. An optical measuring device, comprising
a light source,
a photo-detector,
a first omnidirectional lens, to which the light can be guided form the said light source, and
a second omnidirectional lens,
means for guiding the light from the first omnidirectional lens to an object in a desired direction,
means for collecting the light reflected from the object through the second omnidirectional lens to the photo-detector, wherein one of the first and second omnidirectional lenses is an omnidirectional lens, which comprises
a central portion, through which light can be guided in a first direction, and
an edge portion, which surrounds the central portion, and which is arranged to guide light arriving at the edge portion omnidirectionally with respect to the first direction at an oblique angle or essentially transversely relative to the first direction,
the edge portion is arranged to guide the light, which has passed through in the first direction and been reflected back to the edge portion, through the central portion in a second direction, which deviates from the first direction.

11. The measuring device according to claim 10, wherein the means for guiding the light to the object in the desired direction and the means for collecting the light reflected from the object comprise one rotatable or tiltable mirror, from the opposite surfaces of which the light can be reflected to the object and to the detector through the first and second lens, respectively.

12. The measuring device according to claim 11, wherein the rotatable or tiltable mirror is arranged at an oblique angle relative to the optical axes of the first and second omnidirectional lenses.

13. The measuring device according to claim 10, wherein the measuring device is a laser radar.

14. A method for optical measurement, comprising
emitting light to an object through a first omnidirectional lens,
collecting light from the object through a second omnidirectional lens,
further comprising
using a lens according to claim 1 as one of the omnidirectional lenses, through the central area of which the light is guided transversely.

15. The method according to claim 14, comprising
emitting light from a light source,
collimating the light with the aid of the central portion of the first omnidirectional lens,
guiding the light to a rotatable or tiltable mirror, which is placed at an angle relative to the collimated beam,
reflecting the light from a first surface of the rotatable or tiltable mirror to the edge portion of the first omnidirectional lens, where a direction of travel of the light is changed to become essentially transverse to the collimated light beam,
guiding the transverse-direction light to an object,
collecting the light reflected from the object with the aid of the edge portion of the second omnidirectional lens, from which the light is guided to a second surface of the mirror, which is opposite to the first surface, reflecting the light from the second surface of the mirror, through the central portion of the second omnidirectional mirror, to a photo-detector.

16. The lens according to claim 2, wherein the edge portion is arranged to turn the direction of travel of the light by more than 90°.

17. The lens according to claim 2, wherein the edge portion is arranged to collect or guide the light by 360° around the first direction and to guide or collect the light through the central portion, respectively.

18. The lens according to claim 2, wherein the central portion consists of a lens, particularly a concave lens, the optical axis of which is in the first direction.

19. The lens according to claim 2, wherein the edge portion continues from the central portion as a circularly symmetrical shoulder essentially at right angles relative to the first direction.

20. The lens according to claim 2, consisting of a unified piece manufactured from a single optical material.

21. The lens according to claim 2, wherein the second direction is at an angle of 45°-135° relative to the first direction.

22. A lens-mirror arrangement, comprising a lens according to claim 2, as well as the mirror set at the angle to the first direction, the mirror being typically rotatable or tiltable, and to which the light can be guided through the central portion of the lens, and which is arranged to guide the light to the said edge portion, in order to guide it further through the central portion in said second direction, and then out of the lens.

\* \* \* \* \*